(12) United States Patent
Tapaninen

(10) Patent No.: US 8,432,866 B1
(45) Date of Patent: Apr. 30, 2013

(54) CHANNEL QUALITY

(71) Applicant: Renesas Mobile Corporation, Tokyo (JP)

(72) Inventor: Jukka Pekka Tapaninen, Espoo (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/676,624

(22) Filed: Nov. 14, 2012

(30) Foreign Application Priority Data

Feb. 29, 2012 (GB) .................................. 1203570.5

(51) Int. Cl.
  *H04Q 7/00* (2006.01)
(52) U.S. Cl.
  USPC ........................... 370/329; 370/330; 370/252
(58) Field of Classification Search .................. 370/329, 370/330, 252; 375/259, 219
  See application file for complete search history.

(56) References Cited

U.S. PATENT DOCUMENTS

| | | | |
|---|---|---|---|
| 2009/0168711 A1* | 7/2009 | Fukuoka et al. | 370/329 |
| 2010/0074128 A1* | 3/2010 | Ishii | 370/252 |
| 2010/0128614 A1* | 5/2010 | Kuusela et al. | 370/252 |
| 2011/0026471 A1* | 2/2011 | Miki et al. | 370/329 |
| 2011/0176619 A1* | 7/2011 | Luo et al. | 375/259 |
| 2011/0206098 A1* | 8/2011 | Lindoff et al. | 375/219 |
| 2011/0294439 A1* | 12/2011 | Ofuji et al. | 455/70 |
| 2013/0010623 A1* | 1/2013 | Golitschek | 370/252 |

FOREIGN PATENT DOCUMENTS

| | | |
|---|---|---|
| EP | 1 162 774 A1 | 12/2001 |
| EP | 2 214 435 A1 | 8/2010 |
| WO | WO 2006/118491 A1 | 11/2006 |

OTHER PUBLICATIONS

UKIPO Combined Search and Examination Report under Section 17 and 18(3) dated Jun. 14, 2012 which is issued in a related British Application No. GB1203570.5 (6 pages).

* cited by examiner

*Primary Examiner* — Chuong T Ho
(74) *Attorney, Agent, or Firm* — Robert P. Michal; Lucas & Mercanti, LLP

(57) ABSTRACT

Measures for obtaining channel quality indicator (CQI) in a communication system. Such measures may comprise receiving a first transmission, acquiring a number indicative of a size of a subsequent second transmission, estimating a signal to interference ratio based on said received first transmission, and determining transmission parameter information including at least one of a transport block size indicating a number of bits per packet, a modulation scheme and a code rate based on said signal to interference ratio and said number.

18 Claims, 11 Drawing Sheets

CHANNEL QUALITY

CROSS REFERENCE TO RELATED APPLICATION

This application claims the benefit of foreign priority under 35 U.S.C. §119(a) and 37 CFR §1.55 to UK Patent Application No. 1203570.5, filed on Feb. 29, 2012, the entire content of which is incorporated herein by reference.

TECHNICAL FIELD

The present disclosure relates to obtaining channel quality indicator in a communication system. More specifically, the present disclosure relates to methods, apparatus, computer software and computer program products configured to calculate components presenting a channel quality indicator in a packet-based communication system.

BACKGROUND INFORMATION

Mobile data transmission and data services are constantly making progress. With the increasing penetration of such services, a need for increased transmission rates for conveying data is emerging, whereby an occurrence of transmission errors should be minimized or maintained at an acceptable level. One currently favored technical solution to control a transmission error rate is known as the channel quality indicator (CQI).

CQI is currently used in systems implementing the 3G wireless communication standards (using e.g. wideband code division multiple access in frequency division duplex mode WCDMA FDD, time division synchronous code division multiple access TD-SCDMA and code division multiple access 1x evolution data optimized CDMA2000 1x EVDO) or future wireless communication standards 3.9G or 4G (e.g. long-term evolution LIE, long-term evolution-advanced LTE-A), and may in general be used in systems where data is transmitted in the form of packets.

Currently, in the field of mobile data transmission, a system known as high-speed downlink packet access (HSDPA) is used. The following explanation is performed on the basis of HSDPA implementing TD-SCDMA only as an example. In this system, a terminal as a user equipment (UE) communicates with a base station such as an evolved Node B, i.e. an eNodeB (eNB). Whereas the following description is performed as a method controlling the base station to terminal transmission it is understood that the same method can be used in the other direction in case a CQI based mechanism is used in data transmission from terminal to base station.

CQI is an indication of the propagation conditions (e.g. path loss, interference, noise level) of the transmission path between a transmitter and a receiver experienced by the receiver. A CQI is obtained at a UE and subsequently transmitted to an eNB. With the received CQI, the eNB is able to adjust its transmission conditions in order to maintain an acceptable transmission error rate. Further, a scheduling between a plurality of UEs to be served by the eNB can be performed.

Typically, a CQI is obtained at the UE by estimating the signal to interference ratio (SIR) of a received signal and subsequently by determination of adjustable transmission parameters based on the SIR. According to discussions with respect to the standard WCDMA FDD, thereby an estimated SIR is mapped onto a CQI index by performing the equation $$CQI = \mathrm{floor}(SIR + \mathrm{offset}[dB]).$$

It is noted that "offset" represents a constant value. As an example, when the constant value offset is set to 3.5 dB, for an estimated SIR of 10.0 dB, a CQI of 13 is determined. Thereby, each CQI represents a combination of transmission parameters (e.g. transport block size, modulation scheme, coding rate).

However, such processing has some associated disadvantages. Since the mapping is performed merely by adding a constant value, the SIR range is evenly represented by the CQIs, i.e. there is a 1 dB step in the SIR range between two consecutive CQI's. Each CQI is assigned to a combination of transmission parameters. Such assignment is typically implemented by a look-up table, i.e. the transmission parameters (e.g. transport block size, modulation scheme, coding rate) represented by the determined CQI can be obtained by a look-up table operation. However a dependency of the transmission parameters on the SIR is not generally linear. Thus, such a simple mapping is not suitable for each CQI implementation. For example, in TD-SCDMA, there is no fixed SIR step between consecutive CQIs and thus a simple linear mapping is not suitable. However, in TD-SCDMA a standardization of CQI mapping, i.e. determination of transmission parameters based on received signal quality, is not addressed at all.

Further, it is observed that the size of a transmission, i.e. the number of assigned resource units (RU) have an influence on the error rate of a transmission. However, such a number of RUs cannot be considered in a CQI mapping according to the example shown above. In addition, although a CQI is suitable for minimizing an error rate of a transmission to an acceptable value, there is no method known for maintaining a certain block error rate (BLER) of received transport blocks.

The above stated disadvantages point out that current implementations of the CQI cannot consider possible non-linear dependency of transmission parameters optimal for a certain SIR on said SIR. Furthermore, the size of a transmission to be transmitted is not considered for determination of optimal transmission parameters.

Hence, the problem arises, as to how actual existing propagation parameters and the size of a transmission to be transmitted can be mapped to optimal transmission parameters such as transport block size and modulation scheme used for the transmission, and how a predetermined block error rate can be maintained.

Thus, there is a need to improve techniques for determining the CQI in order to improve the adaptation of transmission parameters to present propagation conditions of the transmission path between an eNB and a UE.

SUMMARY

According to a first aspect of the present invention, there is provided a method for obtaining channel quality indicator in a communication system, the method comprising receiving a first transmission, acquiring a number indicative of a size of a subsequent second transmission, the size being associated with the number of resource units assigned for the second transmission, estimating a signal to interference ratio based on said received first transmission, determining transmission parameter information including at least one of a transport block size indicating a number of bits per packet, a modulation scheme and a code rate based on said signal to interference ratio and said number; and transmitting the determined transmission parameter information to a device transmitting the first and second transmissions.

According to a second aspect of the present invention, there is provided an apparatus for use in obtaining channel quality indicator in a cellular system, the apparatus comprising a processing system arranged to cause the apparatus to receive a first transmission, acquire a number indicative of a size of a subsequent second transmission, the size being associated with the number of resource units assigned for the second transmission, estimate a signal to interference ratio based on said received first transmission, determine transmission parameter information including at least one of a transport block size indicating a number of bits per packet, a modulation scheme and a code rate based on said signal to interference ratio and said number; and transmit the determined transmission parameter information to a device transmitting the first and second transmissions.

According to a third aspect of the present invention, there is provided computer software for performing a method according to the first aspect of the present invention.

According to a fourth aspect of the present invention, there is provided a computer program product for performing a method according to the first aspect of the present invention.

Respective advantageous further developments are as set out in the corresponding dependent claims.

The above computer program products may be embodied as a (volatile or non-volatile) computer-readable storage medium.

The methods, apparatus and computer program products described in this document, at least in example embodiments, are able to obtain optimal CQI values dependent on propagation conditions and allocated resource units. In particular, transmission parameters (transport block size, modulation scheme, code rate) can be determined by utilizing a parameterized capacity curve, which is a generalization of the Shannon capacity formula. Hence, parameter values needed for the parameterized capacity curve are obtained offline by simulations or measurements under laboratory conditions. These parameters are also affected by the implementation of the receiver. Furthermore, a method of maintaining a desired block error rate in CQI processing is proposed and an extension of the CQI processing by special handling the case of processing close to code rate limit is shown.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
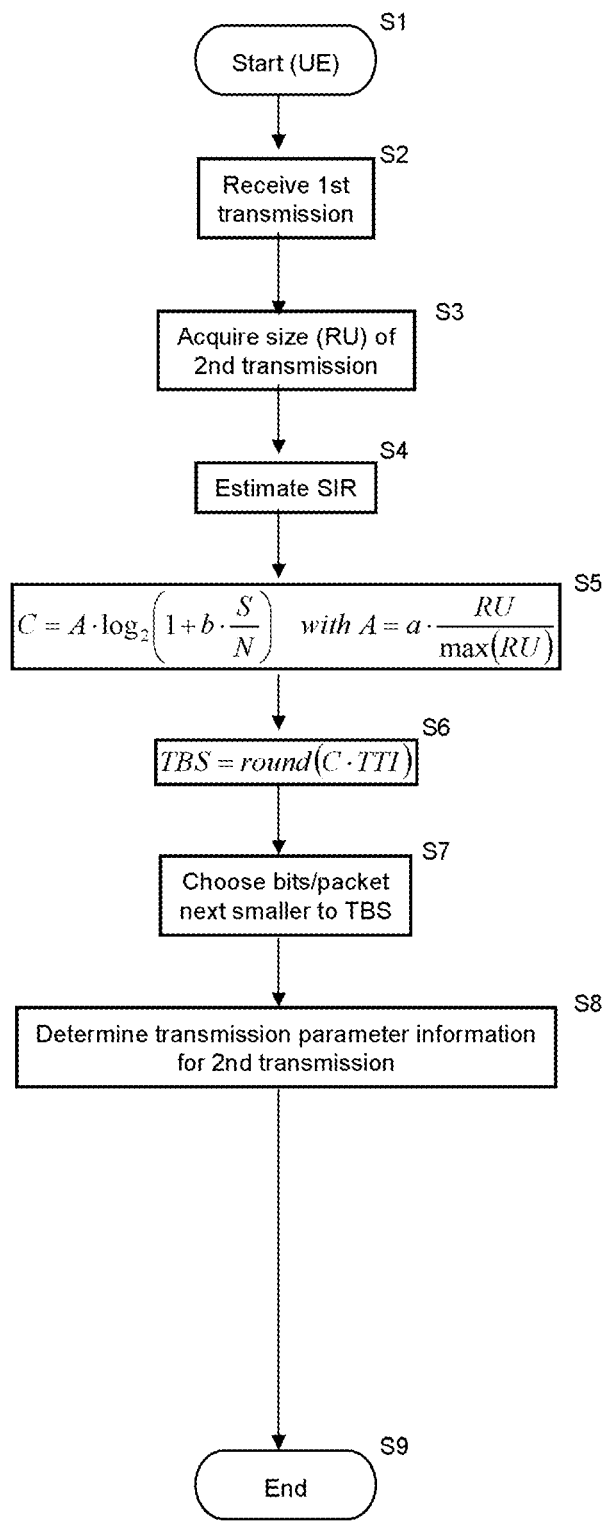
FIG. 1 illustrates example method steps carried out by and implemented at the User Equipment (UE) side, according to one aspect of the invention.

Example aspects of the invention will be described herein below.

The present invention relates in particular but without limitation to mobile communications. It is to be noted that the following example description refers to an environment of the HSDPA system (high-speed downlink packet access) in which packet based transmission and a CQI procedure for enabling scheduling between multiple users and/or adaptively changing transmission parameters based on propagation conditions is deployed. However, it is to be understood that this serves for explanatory purposes only. Other systems differing from the HSDPA system can be adopted as long as they deploy packet-based transmission and a CQI procedure.

In such mobile communication systems one or more UEs communicate with at least one eNB. Such an eNB is able to schedule communication with each of the UEs, that is, transmission resources in both directions are allocated by the eNB. Such scheduling is, amongst other, based on a reception state of the UE. Further, such an eNB is also able to adjust transmission parameters based on a reception state of the DE. However, information regarding the reception state of the UE is to be transmitted from the UE. Hence, the DE determines the CQI based on propagation conditions and informs such to the eNB.

A determination of a CQI should follow the principle of maximizing the throughput of a single transmission using the allocated resources whilst maintaining the target quality. The allocated resources are defined as resource units (RU). The RUs to be used are informed to the UE by the eNB. In the example HSDPA system implementing TD-SCDMA, signaling of the RUs is done using the high speed shared control channel (HS-SCCH), the control channel relevant to the high speed downlink shared channel (HS-DSCH). The allocated RUs may change each time a new packet is transmitted and the number of allocated RUs may vary between a system inherent minimum and maximum value.

In the example TD-SCDMA system, the RUs typically equal the number of allocated time slots per TTI times the number of allocated channelization codes that are transmitted within one time slot, whereby the number of channelization codes depends on the implemented system. Thereby, the standard defines that the number of channelization codes is the same for all allocated HS-DSCH slots in a TTI. In WCDMA systems, which do not implement time division of TTI, the RUs equal the number of allocated channelization codes per TTI. The number of resource units refers to a quantitative measure of resources available for a data transmission intended for one receiver (UE). They may refer to a number of signals of a plurality of parallel transmitted signals intended for one UE, i.e., to a number of portions of a transmission intended for one UE. Thus, the RUs are indicative of a size of a respective transmission related to the UE.

The target quality to maintain is in general given as a block error rate BLER, which denotes the proportion of received data blocks which are decoded erroneously. The BLER does not exceed a value of 10%.

The determination of a CQI therefore consists of a mapping of different values of resource units and the measured or estimated SIR to a transport block size (TBS), which presents the number of bits in a transport block, to a modulation scheme and to a code rate.

Thereby, said SIR is continuously spread over a range (e.g. in TD-SCDMA of −10 dB to 30 dB). Further, the values of resource units may be located in a range given by the used system. For example, in TD-SCDMA the maximum number of allocatable channelization codes per time slot is 16, and the maximum number of time slots per TTI is 5. A maximum number of resource units in this example system is thus 16×5=80. A minimum number of resource units depends on a minimum transport block size (TBS), which in the example system is defined to be 240 bits. Such transport block (TBS) requires a minimum of 3 resource units to transmit 240 bits of data. In the example TD-SCDMA system the range for the possible numbers of resource units is defined by 3 and 80. However, the maximum number of allocatable resource units may further be limited by the UE itself.

It is to be noted that UEs may be divided in receiver categories dependent on the performance of the UE and a generation of a standard that is implemented with the UE. For each receiver category there is a list of discrete values for the TBS. The index of each of the discrete values is known as transport format and resource indicator (TFRI). Further, a modulation scheme is characterized by a number of data bits per modulated symbol. In the present system, the modulation schemes quadrature phase shift keying (QPSK) and quadrature amplitude modulation (QAM) are for example employable. Examples for QAM usable in TD-SCDMA or WCDMA are the versions 16QAM, 64QAM and in future versions maybe 256QAM. The code rate of a transmission presents a ratio between the amount of useful information (usually in bits) and the amount of total transmitted data (usually in bits).

According to the present invention the mapping of the SIR and the RU to the channel quality indicator CQI=f(SIR, RU) is performed by introducing a parameterized capacity curve. That capacity curve can be seen as a generalization of the Shannon capacity formula, also known as channel capacity formula, which denotes an upper bound on the amount of information that can be reliably transmitted over a communications channel considering interfering factors of the transmission path.

Using the parameterized capacity curve, measured or estimated SIR and RU value is mapped to a bit rate of the transmission. Based on the time duration of a transport block (TB), a number of bits in a TB can be calculated using the bit rate of the transmission. Such number of bits in a TB is known as transport block size (TBS). The time duration of a block is also known as the transmission time interval (TTI), and is specified as 0.005 s for the example system using TD-SCDMA. Based on the calculated TBS, a modulation scheme and a code rate can be determined. It is to be noted that such a TB is also known as packet, whereby the data contained in such a packet in the logical layer is mapped to physical resources of the physical layer, the size of which is determined by resource units.

It will be understood from the following description, that if desired, the different functions discussed herein may be performed in a different order and/or concurrently with each other. Furthermore, if desired, one or more of the above-described functions may be optional or may be combined with one or more other of the above-described functions.

FIG. 1 illustrates example method steps carried out by and implemented at the User Equipment side (UE) side, according to one aspect of the invention. The process starts with step S1 at the UE, in the following step S2, a first transmission is received. In the next step S3, a number indicative of a size of a second transmission to be received subsequently is acquired. Said number is a value denoting the allocated RUs. In step S4, the signal to interference ratio (SIR) is estimated based on said received first transmission and the process advances to step S5.

In step S5, the maximum transmission hit rate is calculated based on the SIR and the RU value. The maximum transmission hit rate is an upper throughput limit that can theoretically be achieved.

The maximum transmission bit rate is calculated using the parameterized capacity curve:

$$C = A \cdot \log_2(1 + b \cdot (S/N))$$

with $$A = a \cdot (RU/\max\{RU\})$$

with the following symbols:

| | |
|---|---|
| C | maximum transmission bit rate |
| A | is equivalent to the parameter "bandwidth" in the Shannon capacity formula and is directly proportional to the RU value |
| b | is a parameter that denotes an extension to the Shannon capacity formula and indicates how directly a signal to interference ratio (SIR) is mapped to the maximum bit rate; since this parameterized capacity curve is a generalization of the Shannon capacity formula, b would equal "1" in the Shannon capacity formula |
| S/N | corresponds to the SNR; in the implementation according to the present invention, the SNR is replaced by the SIR estimated based on the first transmission |
| RU | number of allocated resource units |
| max(RU) | maximum of allocatable RUs per packet, which depends on system implementation |
| a | predetermined constant value. |

The process then advances to step S6, where the maximum number of bits per packet, i.e. the (maximum) TBS is calculated using the formula;

$$TBS = \text{round}(C \cdot TTI)$$

with the following symbols:

| | |
|---|---|
| TBS | maximum number of bits per packet |
| C | maximum transmission bit rate calculated in step S5 |
| TTI | transmission time interval (TTI), i.e. the time duration of a transport block, which is specified to 0.005 s for the example system using TD-SCDMA. |

In the following step S7, a number of bits per packet, i.e. a transport block size, is chosen. Dependent on the receiver category, there is a list of discrete values for the number of bits per packet. In order not to exceed the calculated maximum number of bits per packet, i.e. the maximum transport block size, the number of bits per packet which is next smaller than the maximum number of bits per packet is chosen from the list of discrete values as the number of bits per packet.

In the subsequent step S8, the transmission parameter information including at least one of a transport block size indicating a number of bits per packet, a modulation scheme and a code rate are determined based on said signal to interference ratio and said number.

With respect to step S8, it is to be noted that only the transport block size, only the modulation scheme or only the code rate or a subset of such may be determined.

However, in some embodiments all values are determined based on the estimated SIR and the RU value and are used in the further processing.

The procedure then ends at step S9.

According to embodiments of the present invention, the transmission parameter information is transmitted to a device transmitting the first and second transmission. Such device can value the transmission parameter information as recommended settings to be used for the second transmission.

According to embodiments of the present invention, in continuation of the illustrated process, the second transmission is performed and received subsequently.

It is to be noted that by implementing the described procedure, the TBS, the modulation scheme and the code rate can be determined for any given combination of SIR and RU values.

Figure 2:
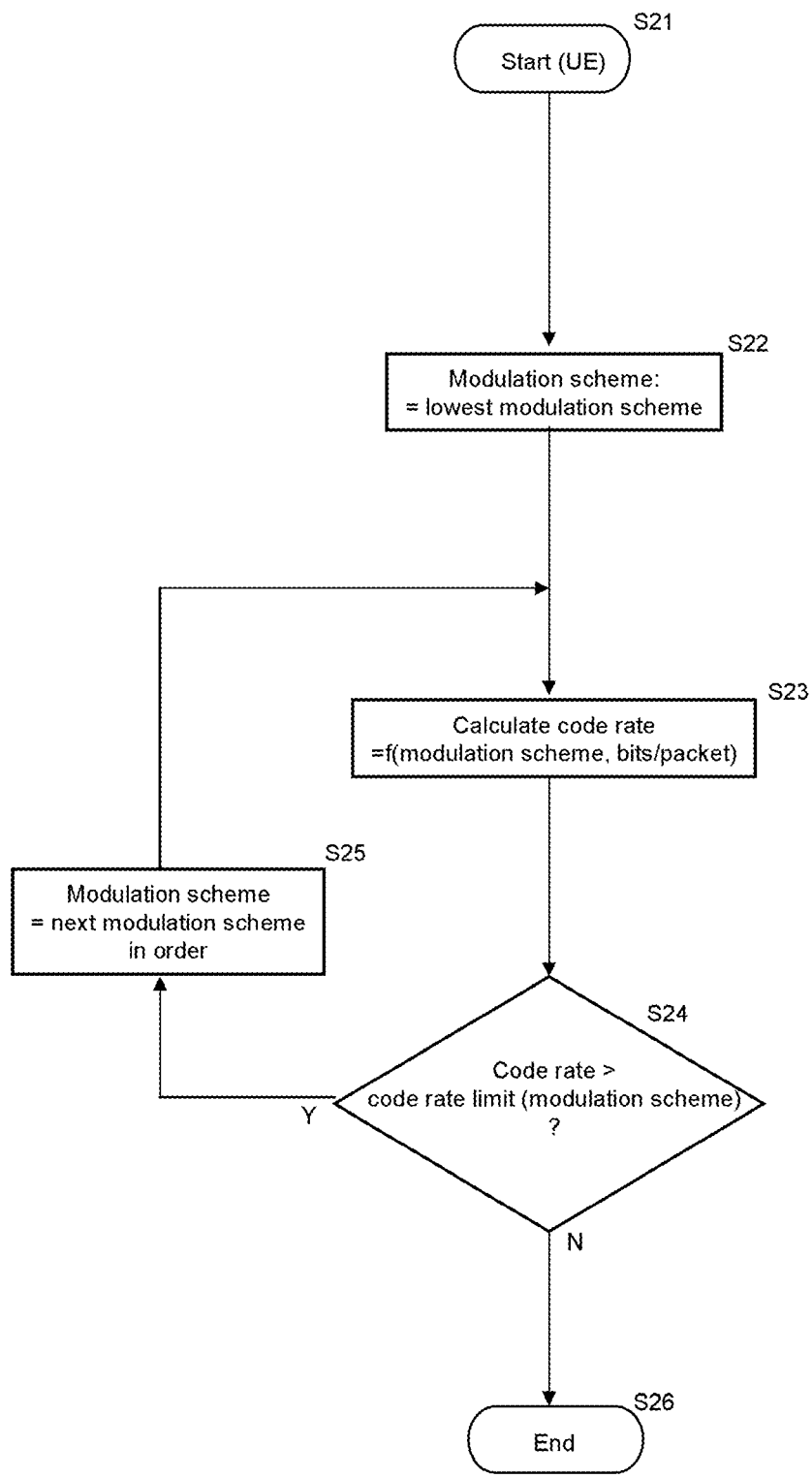
FIG. 2 illustrates example method steps carried out by and implemented at the UE side, according to another aspect of the invention.

FIG. 2 illustrates example method steps carried out by and implemented at the UE side, according to another aspect of the invention. In particular, an implementation of the step (S8) of determination of the transmission parameter information is proposed.

It is to be noted that a system implementing such method should be able to handle a plurality of modulation schemes, which are sorted in ascending order by the number of data bits per modulated symbol. In the current example system using TD-SCDMA, the schemes QPSK, 16QAM and 64QAM may be available.

In this implementation, the modulation scheme is derived as follows: The scheme is started from the lowest modulation scheme in order and a code rate is derived based on the selected modulation scheme. It is to be noted that, since by using a certain scheme a modulated symbol contains a certain number of data bits, a transmission block contains a multiple of the certain number of data bits. The code rate is therefore determined based on the chosen number of bits per packet and the certain number of data bits transmittable using the selected modulation scheme. It is to be noted that the code rate is to be maintained below 1. If the code rate is larger than a predefined code rate limit (e.g. 0.85), the next higher modulation scheme in order is used. The code rate limit may be different for each transition from one modulation to the next modulation scheme in order.

The process starts with an initial step S21 at the UE, which denotes the entry to step S8 of FIG. 1. In the following step S22, the modulation scheme is set to the lowest modulation scheme that can be handled by the respective receiver category.

In the subsequent step S23, a code rate is derived based on the selected modulation scheme and the chosen number of bits per packet and the process advances to step S24.

In step S24 it is determined whether the code rate exceeds the code rate limit assigned to the selected modulation scheme.

If it is determined that the code rate exceeds the code rate limit assigned to the selected modulation scheme (Yes in step S24), the process advances to step S25.

In step S25, the next modulation scheme in order is selected and the process advances again to step S23.

If it is determined that the code rate does not exceed the code rate limit assigned to the selected modulation scheme (No in step S24), the process advances to step S26 which denotes the exit from step S8 of FIG. 1. It is to be noted that the latest selected modulation scheme and the latest calculated code rate represent the determined results of step S8 of FIG. 1.

Figure 3:
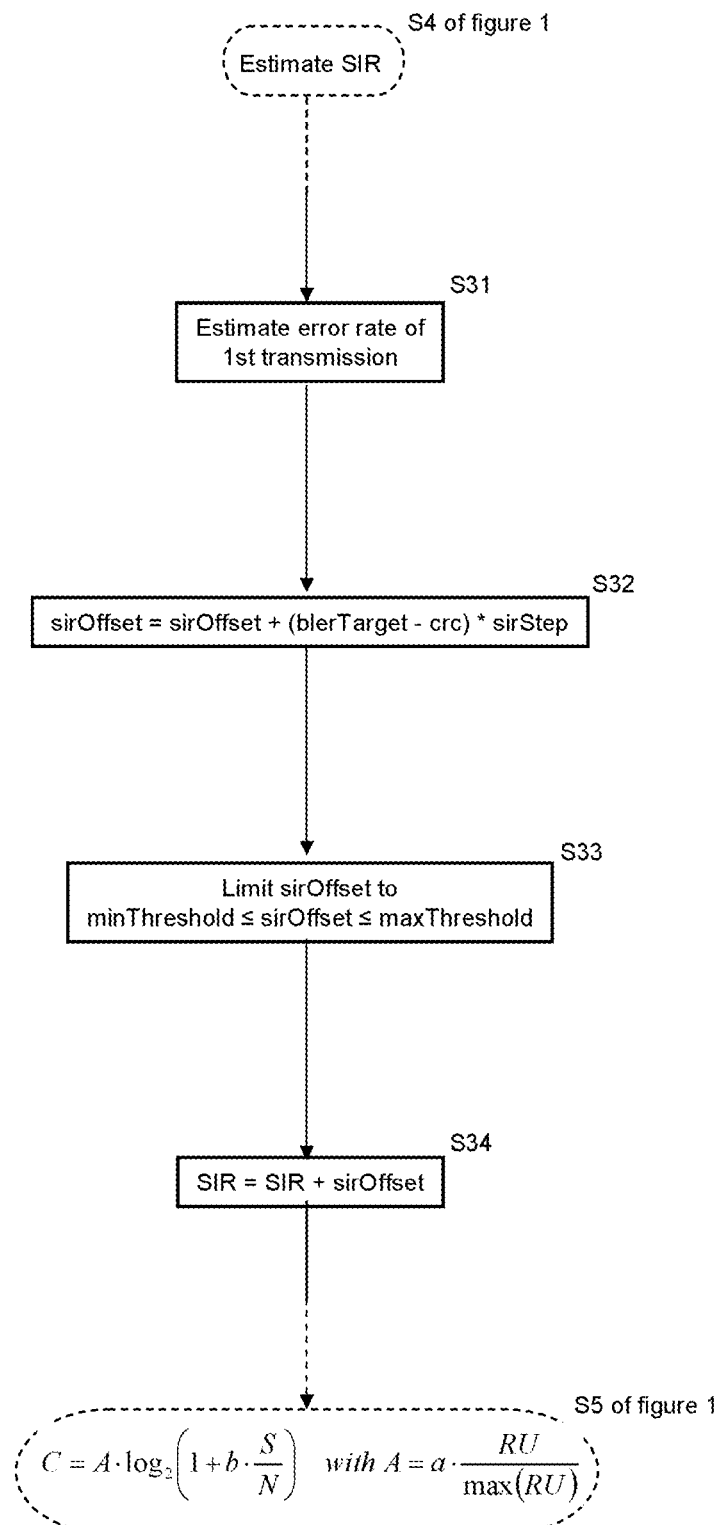
FIG. 3 illustrates example method steps carried out by and implemented at the UE side, according to another aspect of the invention.

FIG. 3 illustrates example method steps carried out by and implemented at the UE side, according to another aspect of the invention.

The illustrated method steps show the possibility of maintaining a desired BLER. To realize such maintaining, a control loop is applied to the estimated SIR. Hence, the actual BLER is estimated by means of a cyclic redundancy check (CRC), and an offset to be added to the estimated SIR is determined based on the difference of a target BLER and the estimated actual BLER as follows.

It is to be noted that this aspect of the invention can be used in addition to the aspect illustrated in FIGS. 1 and 2 and is to be applied before mapping the estimated SIR to the maximum transmission hit rate. The following steps are therefore to be inserted between steps S4 and S5 of FIG. 1.

The process starts with step S31, wherein an error rate is estimated based on the first transmission.

In the following step S32, an offset for the estimated SIR is computed. Such computation may be implemented using the following code example:

$$\text{sirOffset}(n) = \text{sirOffset}(n) + (\text{blerTarget} - \text{crc}(n)) * \text{sirStep}$$

with the following symbols:

| | |
|---|---|
| sirOffset | offset for the estimated SIR |
| blerTarget | target BLER value to be maintained |
| crc | actual BLER estimated by means of CRC |
| sirStep | gain |
| n | time index in units of as TTI (current iteration). |

In the following step S33, the computed SIR offset is limited to a range defined by an upper and a lower threshold value. Such computation may be implemented using the following code example:

$$\text{Limit sirOffset}(n) \text{ to (minThreshold, maxThreshold)}$$

with the following symbols:

| | |
|---|---|
| sirOffset | offset for the estimated SIR |
| minThreshold | lower limit of the offset range |
| maxThreshold | upper limit of the offset range |
| n | time index in units of a TTI (current iteration). |

In the following step S34, SIR offset is added to the estimated SIR. Such computation may be implemented using the following code example:

$$\text{sir}(n) = \text{sir}(n) + \text{sirOffset}(n)$$

with the following symbols:

| | |
|---|---|
| sirOffset | offset for the estimated SIR |
| sir | estimated and modified SIR |
| n | time index in units of a TTI (current iteration). |

The process ends with completion of step S34, and if inserted between steps S4 and S5 of FIG. 1, advances to step S5 of FIG. 1.

The described method steps provide a mechanism to obtain a proper operating point for transmissions to be received, e.g. transmissions using high speed downlink shared channel (HS-DSCH) in the example HSDPA system.

For example, when UE estimated a certain SIR value and requests a certain combination of TBS, modulation scheme and code rate, but determines CRC errors based on the respective received transmission by using the above described method, the UE can revise the SIR down and request respectively down-revised combination of TBS, modulation scheme and code rate for a subsequent transmission.

On the other hand, a suboptimal transmission occurs if the requested combination of TBS, modulation scheme and code rate is set too low. By implementing the above described method, the UE can revise the SIR up and request respectively up-revised combination of TBS, modulation scheme and code rate for a subsequent transmission, if the UE determines an error rate far below the BLER to be maintained.

Thus, the proposed process provides a robust method against a bias in SIR estimation or in predetermination of the parameters of the parameterized capacity curve.

The process further provides a mechanism to alleviate potential bias in case SIR measurement reference data and decoder input data differ. This could e.g. be in the case of advanced receivers (iterative receivers, or generally implementations with feedback), where SIR measurement is based on data after the detection (first iteration), which is processed further in the meantime.

It is to be noted that in some embodiments, parts of the control loop are implemented on the eNB side. However, in other embodiments the control loop is implemented completely on the UE side.

The process described in connection with FIG. 3 implements an estimation of the error rate by means of the CRC prior to a determination of the CQI, i.e., prior to the determination of a modulation scheme and a code rate.

Figure 7:
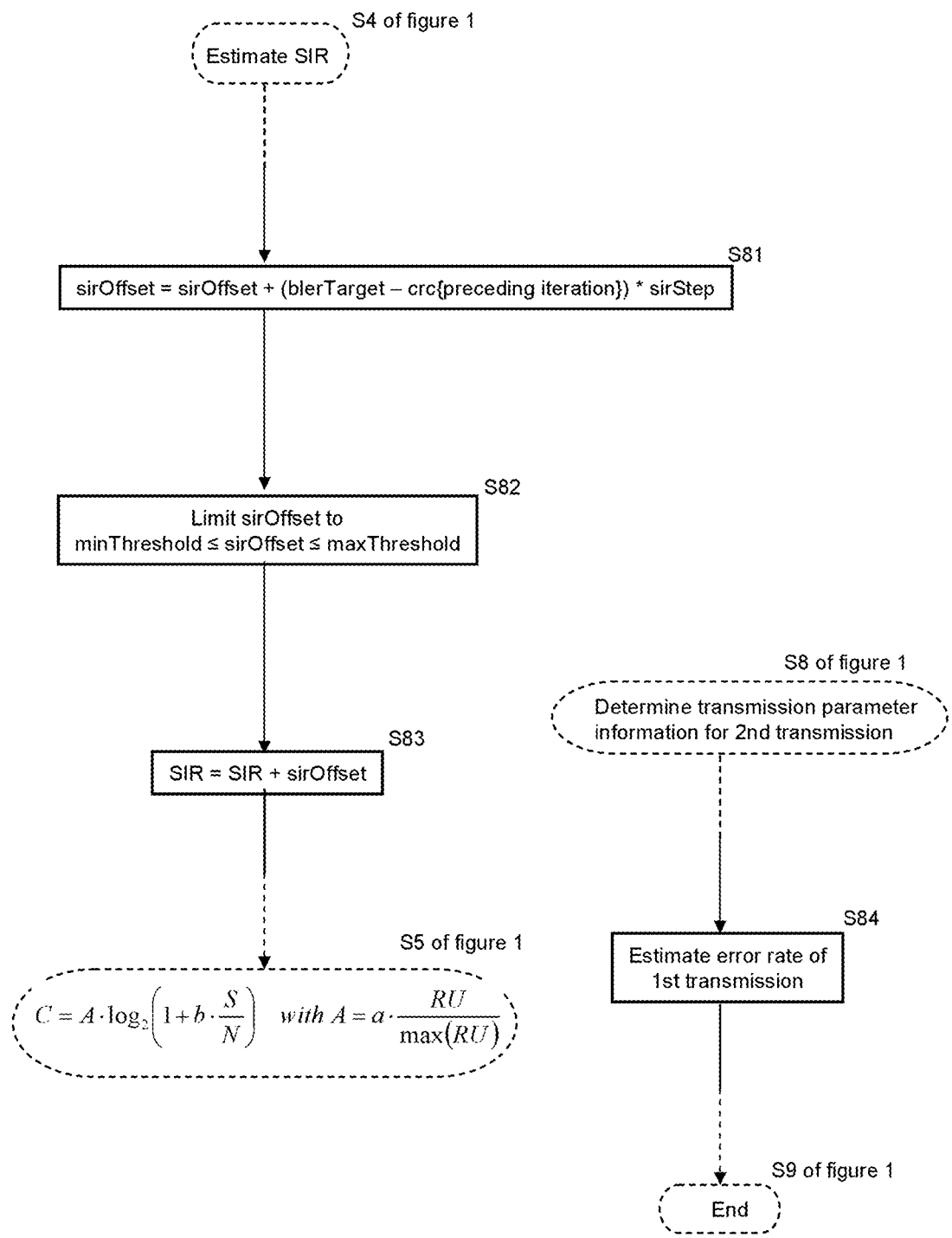
FIG. 7 illustrates example method steps carried out by and implemented at the UE side, according to another aspect of the invention.

However, a different implementation is described in connection with FIG. 7, which illustrates example method steps carried out by and implemented at the UE side, according to another aspect of the invention.

Contrary to the process as illustrated in FIG. 3, the transmission parameter information is determined prior to the decoding of the received packet and the determination of the CRC of said received packet. Thus, the offset for the estimated SIR is be computed by means of the CRC determined during the preceding iteration.

It is to be noted that also this aspect of the invention can be used in addition to the aspect illustrated in FIGS. 1 and 2 and is partly to be applied before mapping the estimated SIR to the maximum transmission bit rate and partly after transmission parameter information are determined. The following steps are therefore partly to be inserted between steps S4 and S5 of FIG. 1 and partly to be inserted between steps S8 and S9 of FIG. 1.

The process starts with step S81, wherein an offset for the estimated SIR is computed based on an error rate (CRC) determined during the preceding iteration. Such computation may be implemented using the following code example:

$sirOffset(n)=sirOffset(n)+(blerTarget-crc(n-1))*sirStep$ with the following symbols:

| | |
|---|---|
| sirOffset | offset for the estimated SIR |
| blerTarget | target BLER value to be maintained |
| crc | actual BLER estimated by means of CRC |
| sirStep | gain |
| n | current iteration |
| n-1 | preceding iteration. |

In the following step S82, the computed SIR offset is limited to a range defined by an upper and a lower threshold value. Such computation may be implemented using the following code example:

Limit sirOffset(n) to (minThreshold, maxThreshold)

with the following symbols:

| | |
|---|---|
| sirOffset | offset for the estimated SIR |
| minThreshold | lower limit of the offset range |
| maxThreshold | upper limit of the offset range |
| n | time index in units of a TTI (current iteration). |

In the following step S83, SIR offset is added to the estimated SIR. Such computation may be implemented using the following code example:

$sir(n)=sir(n)+sirOffset(n)$ with the following symbols:

| | |
|---|---|
| sirOffset | offset for the estimated SIR |
| sir | estimated and modified SIR |
| n | time index in units of a TTI (current iteration). |

Thereafter, the process advances to step S5 of FIG. 1 and passes the subsequent steps of the process illustrated in FIG. 1 and returns after step S8 of FIG. 1 to the currently described process.

In the following step S84, an error rate is estimated based on the first transmission. The error rate determined in step S84 is used in a following iteration of the described process.

The process ends with completion of step S84, and if inserted between steps S8 and S9 of FIG. 1, advances to step S9 of FIG. 1, which denotes the end step.

Figure 4:
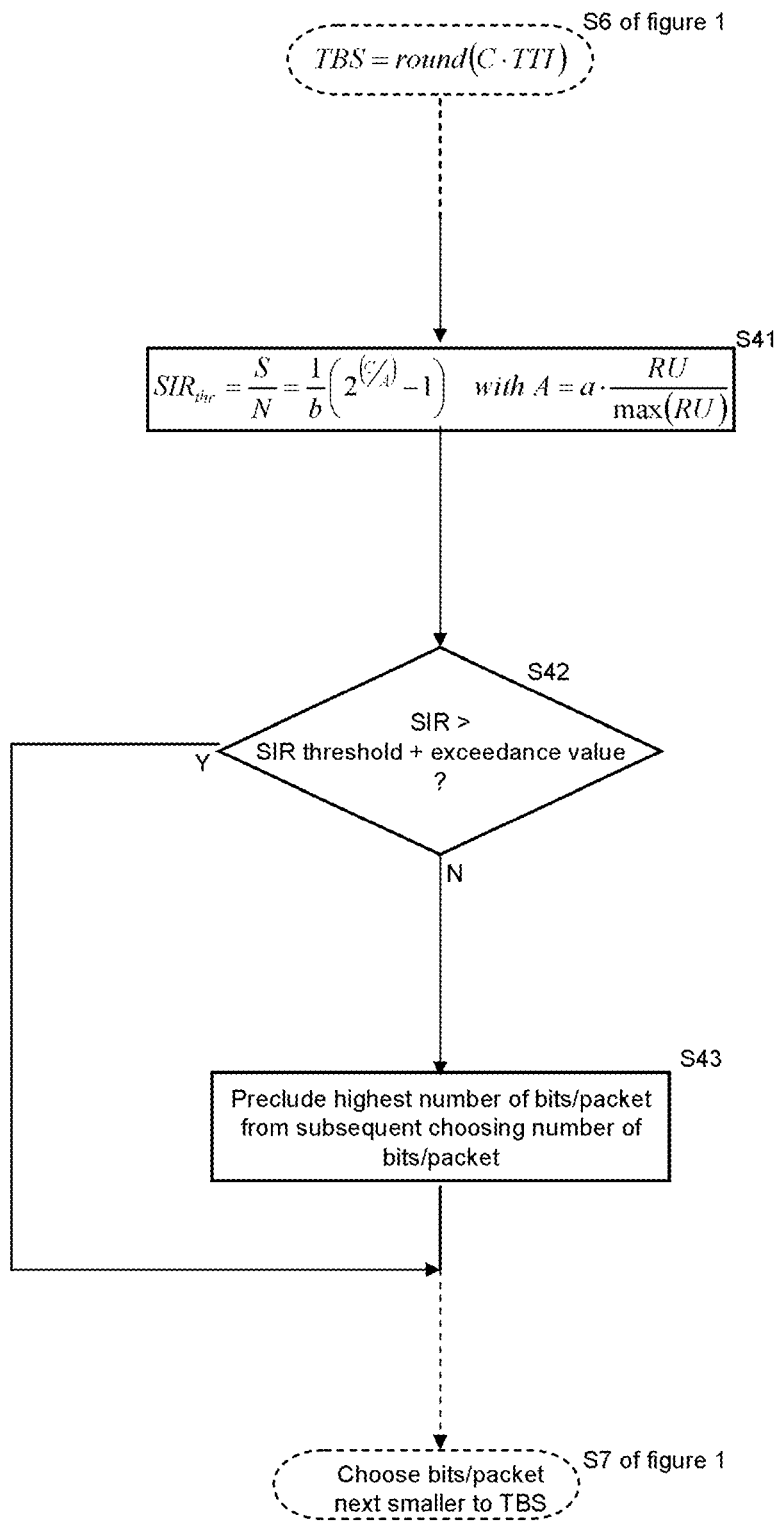
FIG. 4 illustrates example method steps carried out by and implemented at the UE, according to another aspect of the invention.

FIG. 4 illustrates example method steps carried out by and implemented at the UE side, according to another aspect of the invention.

The illustrated method steps show a proposal for processing close to code rate limit. When operating close to capacity limit, i.e. when code rate gets close to "1", the performance is typically worse than anticipated. That is, when operating close to code rate limit, a higher SIR is required to enable error free transmission of the maximum allowed code rate than resulted by the parameterized capacity curve. Typically, maximum allowed code rate can be "0.98" or higher, which indicates almost encoded transmission.

Under the above stated conditions, a lower code rate may be requested, unless propagation conditions (represented by the SIR) are clearly indicating that maximum allowed code rate can be supported.

One possible solution may be using the second highest possible TBS value instead of the highest possible TBS value, if propagation conditions (represented by the SIR) are not indicating that maximum allowed code rate can be supported, when operating close to code rate limit.

The possible TBS values correspond to the list of discrete values for the number of bits per packet which is given for the receiver category of the UE. From that list, the highest and the second highest values can be determined.

It is to be noted that this aspect of the invention can be used in addition to the aspect illustrated in FIGS. 1 and 2 and is to be applied before choosing the number of bits per packet. The following steps are therefore to be inserted between steps S6 and S7 of FIG. 1.

The process starts with step S41, wherein the inverse function of the parameterized capacity curve is used to obtain a SIR threshold based on the highest number of bits per packet and the RU value:

$$SIR_{thr}=(S/N)_{thr}=1/b \cdot (2^{C/A}-1).$$

The SIR threshold is the theoretical value of a SIR which is needed to provide error free transmission using the highest number of bits per packet in processing close to code rate limit.

In the subsequent step S42, it is determined whether the estimated SIR exceeds the SIR threshold by a predetermined exceedance value.

If it is determined that the estimated SIR does not exceed the SIR threshold by a predetermined exceedance value (No in step S42), the process advances to step S43. In S43, the highest number of bits per packet is precluded from subsequent choosing of the number of bits per packet.

The process ends with completion of step S43, and if inserted between steps S6 and S7 of FIG. 1, advances to step S7 of FIG. 1.

If it is determined that the estimated SIR exceeds the SIR threshold by a predetermined exceedance value (Yes in step S42), the process ends with completion of step S42, and if inserted between steps S6 and S7 of FIG. 1, advances to step S7 of FIG. 1.

It is to be noted that in the latter case, the highest number of bits per packet is not precluded from subsequent choosing of the number of bits per packet.

As an example, the exceedance value may be 3 dB. A fixed predefined SIR threshold value cannot be used because the maximum transmission bit rate and thus the SIR threshold depends on the allocated RUs.

Figure 5:
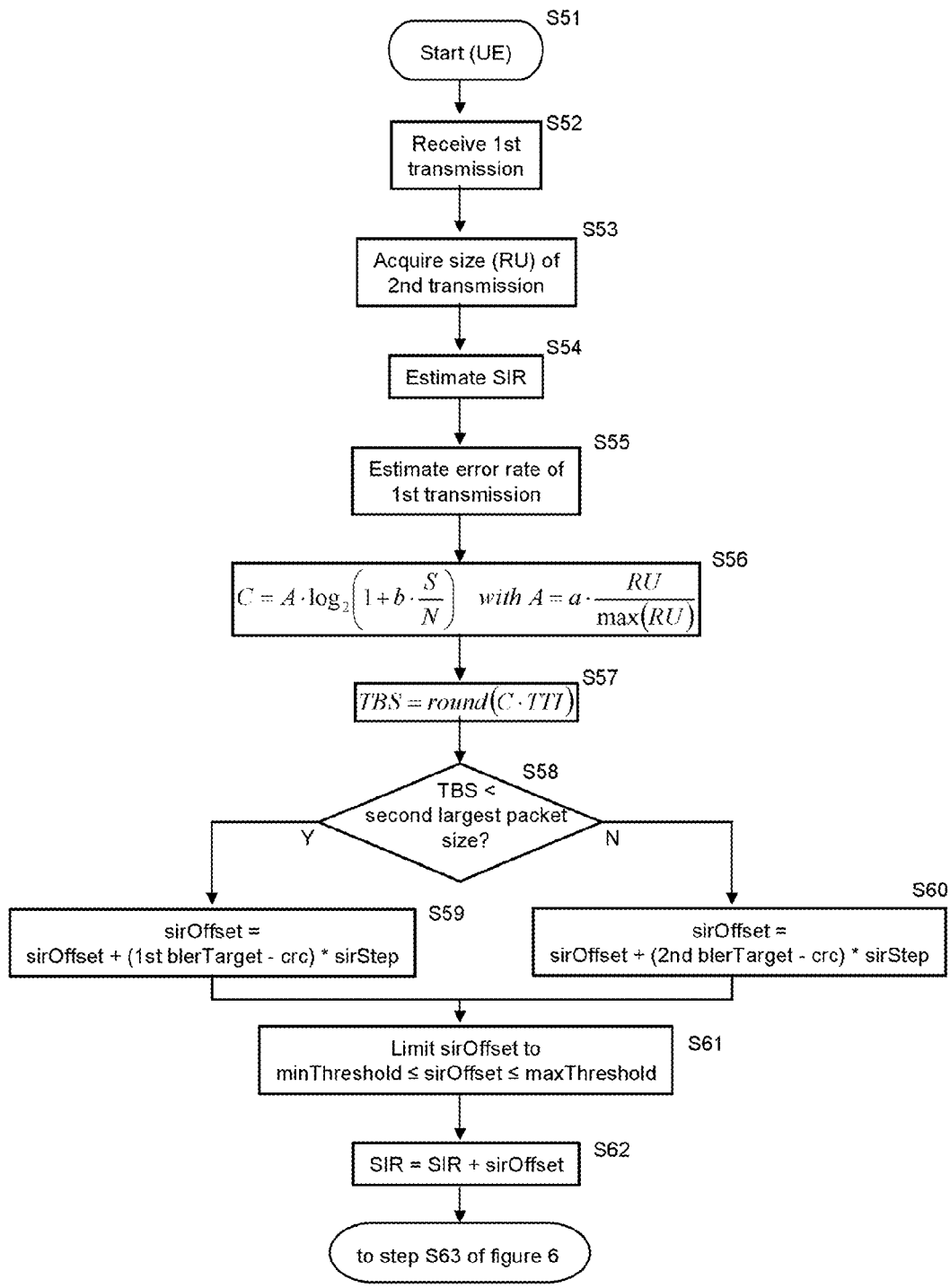
FIGS. 5 and 6 illustrate example method steps carried out by and implemented at the UE side, according to another aspect of the invention.
Figure 6:
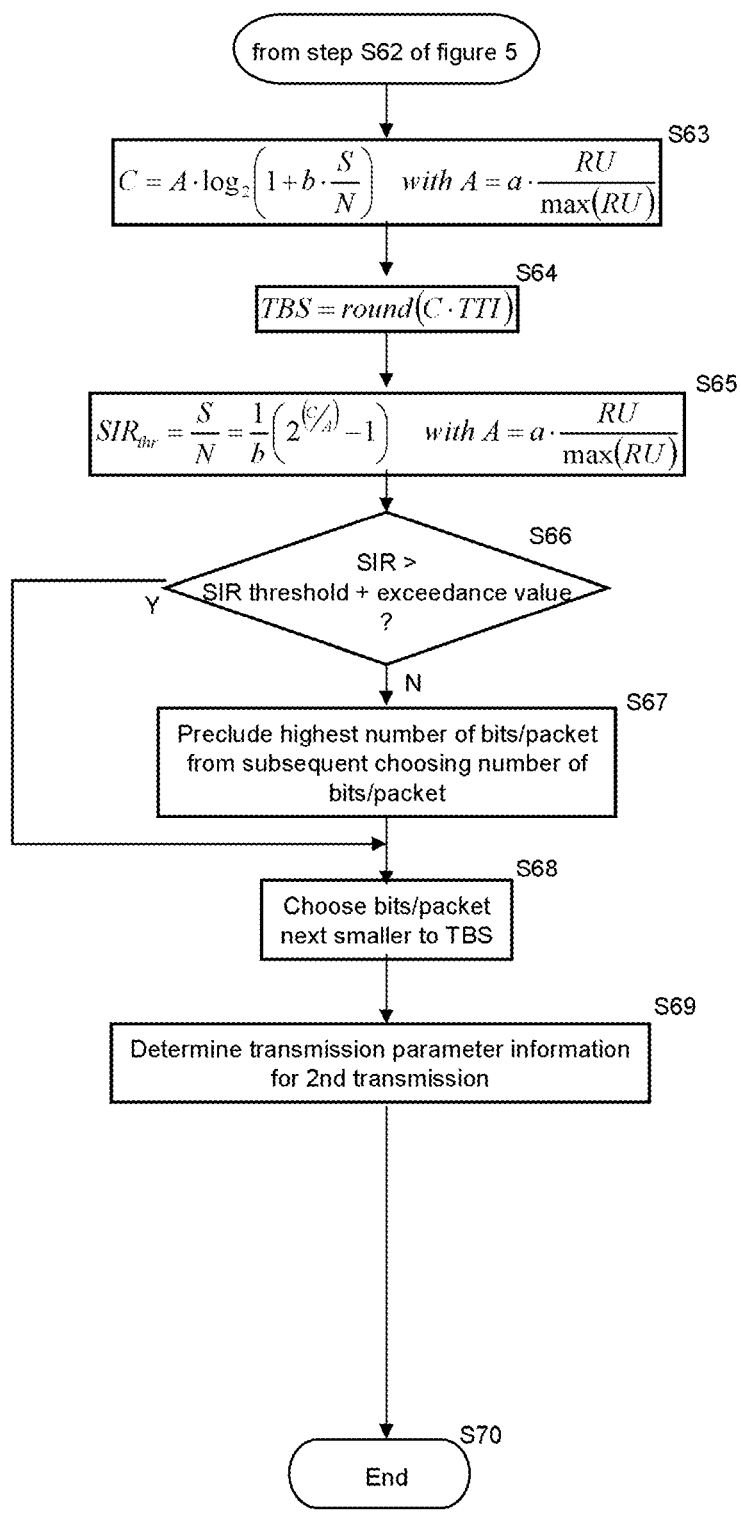

FIGS. 5 and 6 illustrate example method steps carried out by and implemented at the UE side, according to another aspect of the invention.

Referring to the processes illustrated in FIGS. 3 and 4, when reaching the code rate limit, it may be self-defeating for the control loop of the process according to FIG. 3 to drive the operating point towards maximum TBS. In some embodiments in addition to the process according to FIG. 4, a function to revise the target BLER to be maintained down is implemented, when processing close to code rate limit. In particular, the target BLER is revised down when reaching the second largest TBS. As an example, the minimum target BLER value may be "2%".

The process starts with an initial step S51 at the UE. In the following step S52, a first transmission is received. In the next step S53, a number indicative of a size of a second transmission to be received subsequently is acquired. Said number is a value denoting the allocated RUs. After that, in step S54, the signal to interference ratio (SIR) is estimated based on said received first transmission and the process advances to step S55.

In step S55, an error rate is estimated based on the first transmission and the process advances to step S56.

In step S56, the maximum transmission bit rate is calculated based on the SIR and the RU value. The maximum transmission bit rate is an upper throughput limit that can theoretically be achieved.

The maximum transmission bit rate is calculated using the parameterized capacity curve:

$$C = A \cdot \log_2(1 + b \cdot (S/N))$$

with $$A = a \cdot (RU/\max\{RU\})$$

with the following symbols:

| | |
|---|---|
| C | maximum transmission bit rate |
| A | is equivalent to the parameter "bandwidth" in the Shannon capacity formula and is directly proportional to the RU value |
| b | is a parameter that denotes an extension to the Shannon capacity formula and indicates how directly a signal to interference ratio (SIR) is mapped to the maximum bit rate; since this parameterized capacity curve is a generalization of the Shannon capacity formula, b would equal "1" in the Shannon capacity formula |
| S/N | corresponds to the SNR; in the implementation according to the present invention, the SNR is replaced by the SIR estimated based on the first transmission |
| RU | number of allocated resource units |
| max(RU) | maximum of allocatable RUs per packet, which depends on system implementation |
| a | predetermined constant value. |

The process then advances to step S57. In step S57, the maximum number of bits per packet, i.e. the (maximum) TBS is calculated using the formula:

$$TBS = \text{round}(C \cdot TTI)$$

with the following symbols:

| | |
|---|---|
| TBS | maximum number of bits per packet |
| C | maximum transmission bit rate calculated in step S56 |
| TTI | transmission time interval (TTI), i.e the time duration of a transport block, which is specified to 0.005 s for the example system using TD-SCDMA. |

In the subsequent step S58 it is determined whether the maximum number of bits per packet is less than the second highest number of bits per packet of said plurality of numbers of bits per packet defined for the respective receiver category.

If it is determined that the maximum number of bits per packet is less than the second highest number of bits per packet (Yes in step S58), the process advances to step S59.

In the following step S59, an offset for the estimated SIR is computed. Such computation may be implemented using the following code example:

sirOffset(n)=sirOffset(n)+(first blerTarget−crc(n))
    *sirStep with the following symbols:

| | |
|---|---|
| sirOffset | offset for the estimated SIR |
| first blerTarget | first target BLER value to be maintained |
| crc | actual BLER estimated by means of CRC |
| sirStep | gain |
| n | time index in units of a TTI (current iteration). |

After that, the process advances to step S61.

If it is determined that the maximum number of bits per packet is not less than the second highest number of bits per packet (No in step S58), the process advances to step S60.

In the following step S60, an offset for the estimated SIR is computed. Such computation may be implemented using the following code example:

sirOffset(n)=sirOffset(n)+(second blerTarget−
    crc(n))*sirStep with the following symbols:

| | |
|---|---|
| sirOffset | offset for the estimated SIR |
| second blerTarget | second target BLER value to be maintained, which is a reduced target BLER value to be used when processing close to code rate limit |
| crc | actual BLER estimated by means of CRC |
| sirStep | gain |
| n | time index in units of a TTI (current iteration). |

After that, the process advances to step S61.

In step S61, the computed SIR offset is limited to a range defined by an upper and a lower threshold value. Such computation may be implemented using the following code example:

Limit sirOffset(n) to (minThreshold, maxThreshold)

with the following symbols:

| | |
|---|---|
| sirOffset | offset for the estimated SIR |
| minThreshold | lower limit of the offset range |
| maxThreshold | upper limit of the offset range |
| n | time index in units of a TTI (current iteration). |

In the following step S62, SIR offset is added to the estimated SIR. Such computation may be implemented using the following code example:

$sir(n) = sir(n) + sirOffset(n)$ with the following symbols:

| | |
|---|---|
| sirOffset | offset for the estimated SIR |
| sir | estimated and modified SIR |
| n | time index in units of a TTI (current iteration). |

Since the maximum transmission bit rate and the maximum number of bits per packet already calculated in prior steps are dependent on the SIR, both values have to be re-calculated based on the corrected SIR value.

Thus, in the following step S63, the maximum transmission bit rate is re-calculated based on the SIR corrected by offset and the RU value. The maximum transmission bit rate is calculated using the parameterized capacity curve:

$C = A \cdot \log_2(1 + b \cdot (S/N))$ with $A = a \cdot (RU/\max\{RU\})$.

After that, the process advances to step S64. In step S64, the maximum number of bits per packet, i.e. the (maximum) TBS is re-calculated based on the re-calculated maximum transmission bit rate using the formula:

$TBS = \text{round}(C \cdot TTI)$.

In the further step S65, the inverse function of the parameterized capacity curve is used to obtain a SIR threshold based on the highest number of bits per packet and the RU value:

$SIR_{thr} = (S/N)_{thr} = 1/b \cdot (2^{C/A} - 1)$.

The SIR threshold is the theoretical value of a SIR which is needed to provide error free transmission using the highest number of bits per packet in processing close to code rate limit.

In the subsequent step S66, it is determined whether the estimated SIR exceeds the SIR threshold by a predetermined exceedance value.

If it is determined that the estimated SIR does not exceed the SIR threshold by a predetermined exceedance value (No in step S66), the process advances to step S67. In S67, the highest number of bits per packet is precluded from subsequent choosing of the number of bits per packet, and the process advances to step S68.

If it is determined that the estimated SIR exceeds the SIR threshold by a predetermined exceedance value (Yes in step S66), the process advances to step S68.

It is to be noted that in the latter case, the highest number of bits per packet is not precluded from subsequent choosing the number of bits per packet. It is further to be noted that for the exceedance value, an example value of 3 dB is found to be suitable during simulations.

In the following step S68, a number of bits per packet is chosen. Dependent on the receiver category there is a list of discrete values for the number of bits per packet. In order not to exceed the calculated maximum number of bits per packet, the number of bits per packet which is next smaller than the maximum number of bits per packet is chosen from the list of discrete values for the number of bits per packet.

In the subsequent step S69, the transmission parameter information is determined. It is to be noted that the determination may be implemented with a process as illustrated in FIG. 2.

In the following step S70, the determined modulation scheme and code rate are transmitted.

With respect to step S69, it is to be noted that only the transport block size, only the modulation scheme or only the code rate or a subset of those values may be determined. However, in some embodiments, all values are determined based on the estimated SIR and the RU value and may be used in the further processing.

After that, the procedure advances to step S70, which denotes the end step.

According to embodiments of the present invention, the transmission parameter information may be transmitted to a device transmitting the first and second transmission. Such device can value the transmission parameter information as recommended settings to be used for the second transmission.

According to embodiments of the present invention, in continuation of the illustrated process, the second transmission may be performed and received subsequently.

It is also to be noted that by implementing this described procedure, the TBS, the modulation scheme and the code rate can be determined for any given combination of SIR and RU values. Furthermore, a desired BLER can be maintained and the CQI processing can be adjusted when processing close to code rate limit.

The process described in connection with FIGS. 5 and 6 implements an estimation of the error rate by means of the CRC prior to a determination of the transmission parameter information.

Figure 8:
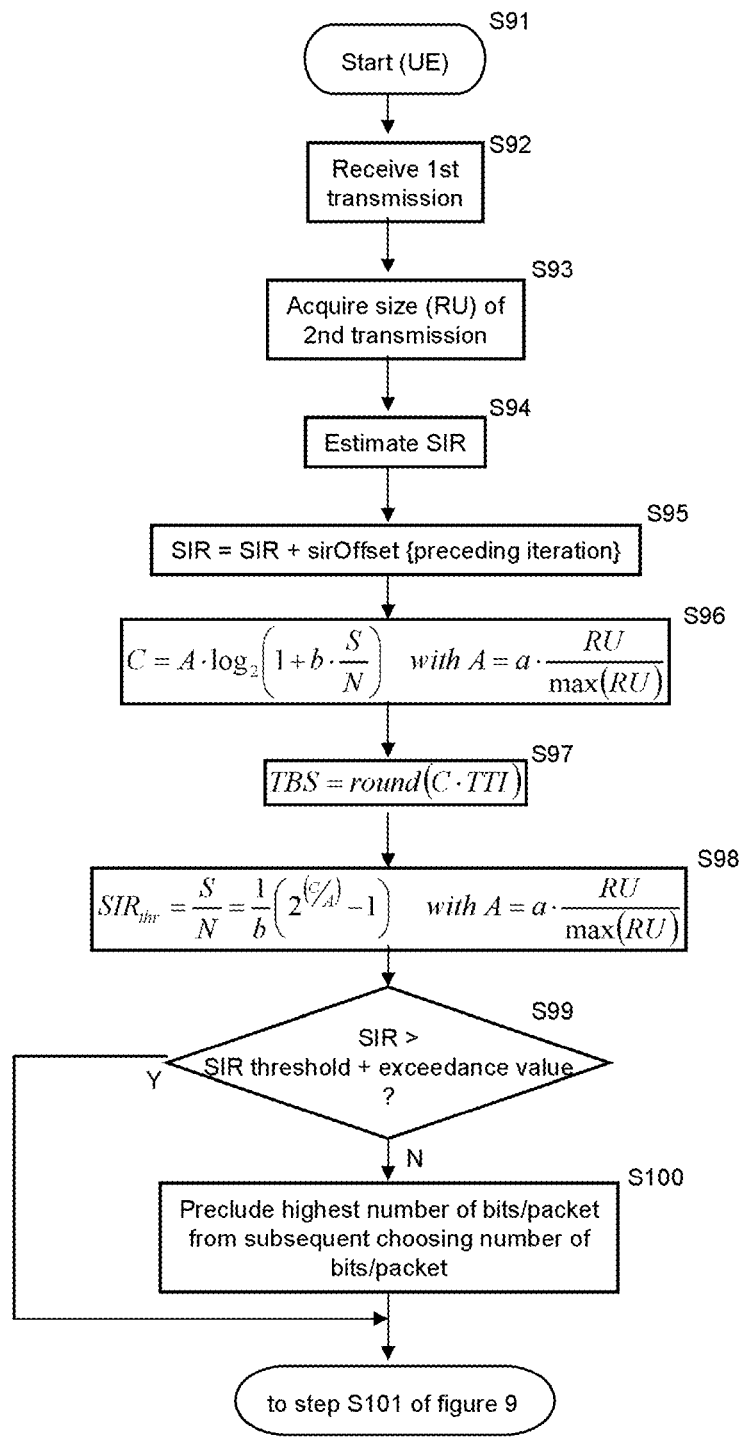
FIGS. 8 and 9 illustrate example method steps carried out by and implemented at the UE side, according to another aspect of the invention.
Figure 9:
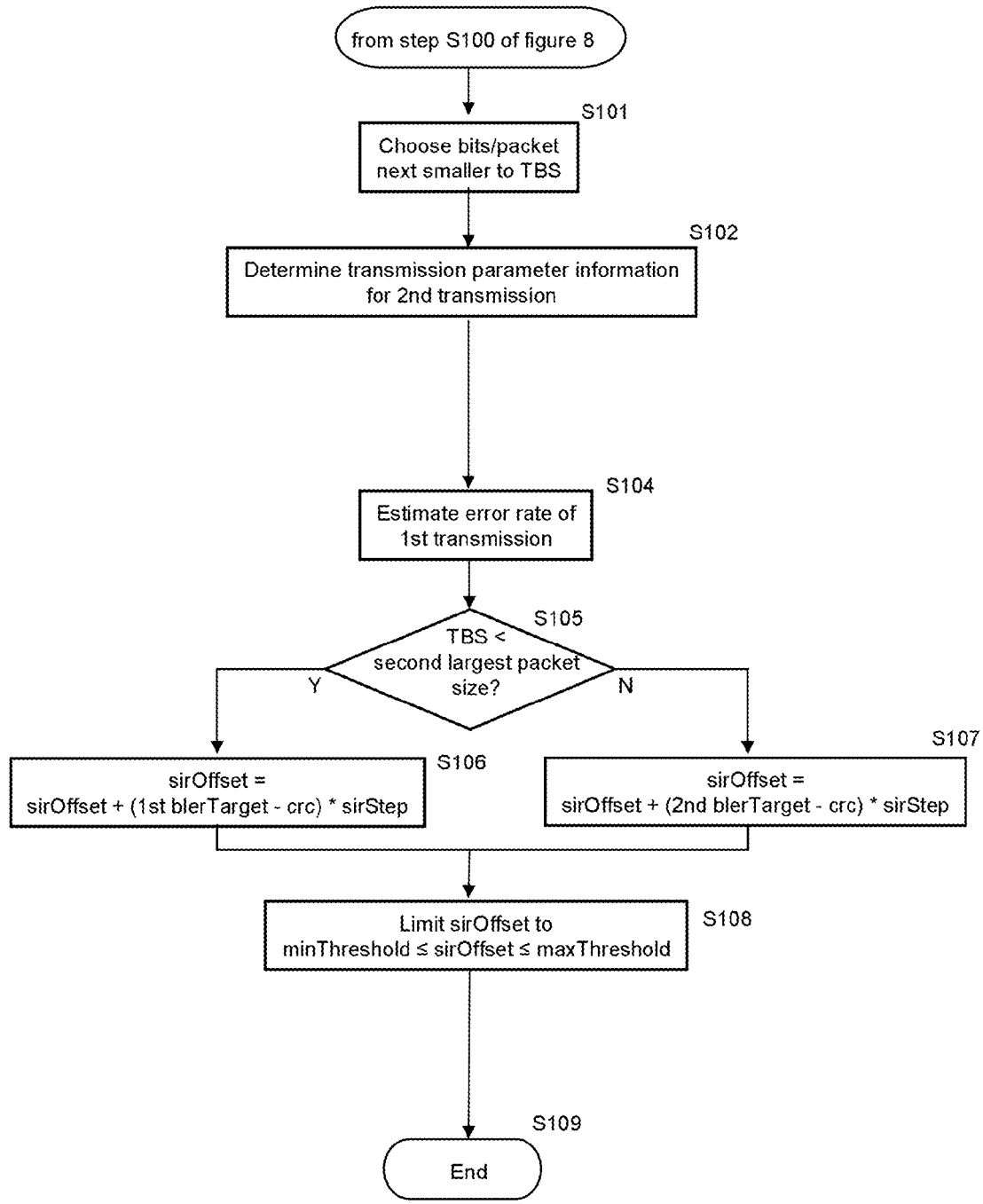

However, a different implementation is described in connection with FIGS. 8 and 9, which illustrate example method steps carried out by and implemented at the UE side, according to another aspect of the invention.

Contrary to the process illustrated in FIGS. 5 and 6, the CQI is determined prior to the decoding of the received packet, the determination of the CRC of said received packet and the subsequent determination of the offset for the estimated SIR. Thus, a current SIR is calculated by adding the offset determined during the preceding iteration to the estimated SIR.

The process starts with step S91 at the UE. In the following step S92, a first transmission is received. In the next step S93, a number indicative of a size of a second transmission to be received subsequently is acquired. Said number is a value denoting the allocated RUs. Subsequently, in step S94, the signal to interference ratio (SIR) is estimated based on said received first transmission and the process advances to step S95.

In the following step S95, SIR offset determined during the preceding iteration is added to the estimated SIR. Such computation may be implemented using the following code example:

$$\text{sir}(n) = \text{sir}(n) + \text{sirOffset}(n-1)$$

with the following symbols:

| | |
|---|---|
| sirOffset | offset for the estimated SIR |
| sir | estimated and modified SIR |
| n | current iteration |
| n-1 | preceding iteration. |

In step S96, the maximum transmission bit rate is calculated based on the SIR and the RU value. The maximum transmission bit rate is an upper throughput limit that can theoretically be achieved.

The maximum transmission bit rate is calculated using the parameterized capacity curve:

$$C = A \cdot \log_2(1 + b \cdot (S/N))$$

with $$A = a \cdot (RU/\max\{RU\}).$$

The process then advances to step S97. In step S97, the maximum number of hits per packet, i.e. the (maximum) TBS is calculated using the formula:

$$TBS = \text{round}(C \cdot TTI).$$

In the further step S98, the inverse function of the parameterized capacity curve is used to obtain a SIR threshold based on the highest number of bits per packet and the RU value:

$$SIR_{thr} = (S/N)_{thr} = 1/b \cdot (2^{C/A} - 1).$$

The SIR threshold is the theoretical value of a SIR which is needed to provide error free transmission using the highest number of hits per packet in processing close to code rate limit.

In the subsequent step S99, it is determined whether the estimated SIR exceeds the SIR threshold by a predetermined exceedance value.

If it is determined that the estimated SIR does not exceed the SIR threshold by a predetermined exceedance value (No in step S99), the process advances to step S100. In S100, the highest number of bits per packet is precluded from subsequent choosing of the number of bits per packet, and the process advances further to step S101.

If it is determined that the estimated SIR exceeds the SIR threshold by a predetermined exceedance value (Yes in step S99), the process advances to step S101.

It is to be noted that in the latter case, the highest number of bits per packet is not precluded from subsequent choosing of the number of bits per packet. It is further to be noted that for the exceedance value, an example value of 3 dB is found to be suitable during simulations.

In the following step S101 a number of bits per packet, i.e. a transport block size, is chosen. Dependent on the receiver category, there is a list of discrete values for the number of bits per packet. In order not to exceed the calculated maximum number of bits per packet, i.e. the maximum transport block size, the number of bits per packet which is next smaller than the maximum number of bits per packet is chosen from the list of discrete values for the number of bits per packet.

In the subsequent step S102, the transmission parameter information including at least one of a transport block size indicating a number of bits per packet, a modulation scheme and a code rate are determined based on said signal to interference ratio and said number. It is to be noted that the determination may be implemented with a process as illustrated in FIG. 2.

In the following step S104, an error rate is estimated based on the first transmission and the process advances to step S105.

In the subsequent step S105 it is determined whether the maximum number of bits per packet is less than the second highest number of bits per packet of said plurality of numbers of bits per packet defined for the respective receiver category.

If it is determined that the maximum number of bits per packet is less than the second highest number of bits per packet (Yes in step S105), the process advances to step S106.

In step S106, an offset for the estimated SIR is computed. Such computation may be implemented using the following code example:

$$\text{sirOffset}(n) = \text{sirOffset}(n) + (\text{first blerTarget} - \text{crc}(n)) \cdot \text{sirStep}.$$

The process then advances to step S108.

If it is determined that the maximum number of bits per packet is not less than the second highest number of hits per packet (No in step S105), the process advances to step S107.

In step S107, an offset for the estimated SIR is computed. Such computation may be implemented using the following code example:

$$\text{sirOffset}(n) = \text{sirOffset}(n) + (\text{second blerTarget} - \text{crc}(n)) \cdot \text{sirStep}.$$

The process then advances to step S108.

In the following step S108, the computed SIR offset is limited to a range defined by an upper and a lower threshold value. Such computation may be implemented using the following code example:

Limit sirOffset(n) to (minThreshold, maxThreshold).

The offset obtained in step S108 is used in a following iteration of the described process.

With respect to steps S102, S103 and S109 it is to be noted that only the transport block size, only the modulation scheme or only the code rate or a subset of those values may be determined. However, in some embodiments, all values are determined based on the estimated SIR and the RU value and are used in the further processing.

The procedure then advances to step S109, which denotes the end step.

It is shown that with such implementation a recalculation of the maximum transmission bit rate and the maximum number of bits per packet is not necessary, contrary to the process illustrated in FIGS. 5 and 6.

Figure 10:
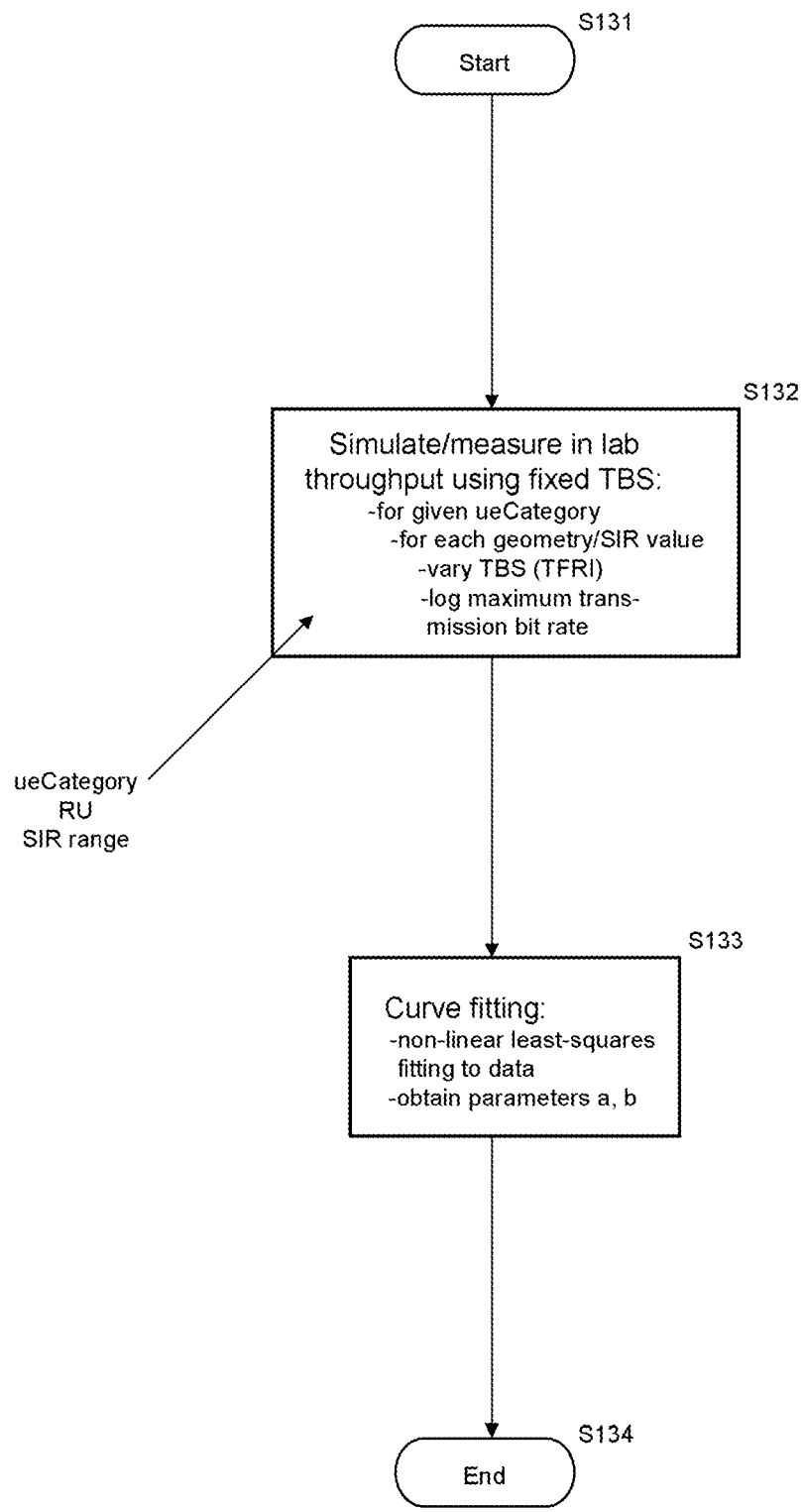
FIG. 10 illustrates example method steps carried out offline by simulation or under laboratory conditions for obtaining parameter values.

FIG. 10 illustrates example method steps carried out offline by simulation or under laboratory conditions for obtaining parameter values.

The process illustrated in FIG. 10, also named "CQI tuning", is used far obtaining the parameter values a and b of the parameterized capacity curve as previously introduced.

The process starts with the initial step S131 and advances to step S132. In step S132 a simulation or a measurement under laboratory conditions is performed. That is, fixed reference channel (FRC) tests are performed. A FRC is a set of parameters used to describe a configuration for packet-based performance evaluation of 3GPP (3rd Generation Partnership Project) systems in which the adaptation of modulation and coding rate is in principle possible (e.g. LTE or HSDPA). In a FRC test, the modulation and coding scheme are fixed, i.e. they are not adapted based on UE feedback.

The tests are performed in additive white gaussian noise (AWGN) channels. AWGN is a channel model in which the influence of the channel to the desired signal by a noise signal with Gaussian signal amplitude and constant spectral noise power density is modeled, which is superimposed on the signal.

The tests are performed using different TFRI values and logging the maximum transmission bit rate, which is also repeated for different geometries, which affect propagation conditions represented by the SIR, and modulation schemes. Further possible variable parameters are the RU value and the receiver category.

From the thus sampled values, a maximum transmission bit rate curve is obtained, which corresponds to the parameterized capacity curve for the given conditions.

In the subsequent step S133, the parameter values a and b are determined using curve fitting methods. For determination of the parameter values, many kinds of nonlinear curve-fitting methods may be used.

In some embodiments, a non-linear least squares method using the Levenberg-Marquardt algorithm is used.

The following step S134 denotes the end step.

It is to be noted that for the process illustrated with FIG. 10, only a single or a small set of RU values is required.

Generally, the above-described procedures and functions may be implemented by respective functional elements, processors, processing system or the like, as described below.

While in the foregoing example embodiments of the present invention are described mainly with reference to methods, procedures and functions, corresponding example embodiments of the present invention also cover respective apparatuses, network nodes and systems, including both software, algorithms, and/or hardware thereof.

Respective example embodiments of the present invention are described below referring to FIG. 11, whilst for the sake of brevity reference is made to the detailed description with regard to FIGS. 1 to 10.

Figure 11:
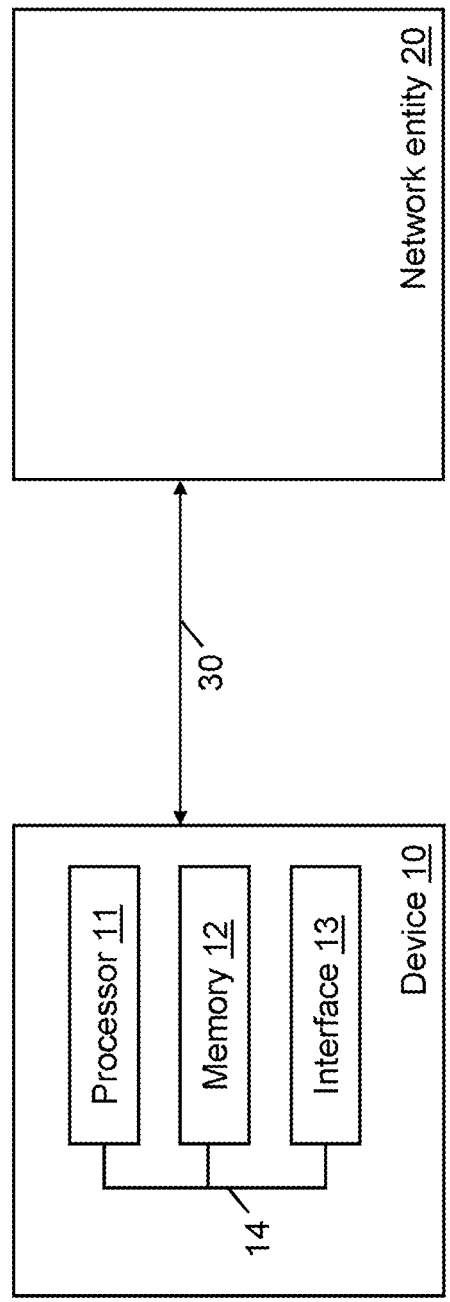
FIG. 11 shows a schematic block diagram illustrating example apparatuses according to example embodiments of the present invention.

In FIG. 11 below, which is noted to represent a simplified block diagram, the solid line blocks are configured to perform respective operations as described above. The entirety of solid line blocks are configured to perform the methods and operations as described above, respectively. With respect to FIG. 11, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of an arrow is meant to illustrate the direction in which certain operations are performed and/or the direction in which certain data is transferred.

Further, in FIG. 11, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Amongst others, memories are provided for storing programs or program instructions for controlling the individual functional entities to operate as described herein.

FIG. 11 shows a schematic block diagram illustrating example apparatuses according to example embodiments of the present invention.

In view of the above, the thus illustrated apparatuses 10 and 20 are suitable for use in practicing the example embodiments of the present invention, as described herein.

The thus described apparatus 10 may represent a (part of a) device such as a base station or access node of a cellular system or a terminal, user equipment, mobile station or modem (which may be installed as part of a terminal, user equipment, mobile station, but may be also a separate module, which can be attached to various devices), and may be configured to perform a procedure and/or functionality as described in conjunction with any one of FIGS. 1 to 10. The thus described apparatus 20 may represent a (part of a) device such as a terminal, user equipment, mobile station or modem (which may be installed as part of a terminal, user equipment, mobile station, but may be also a separate module, which can be attached to various devices) or a base station or access node of a cellular system, and may be configured to perform a procedure and/or functionality as indicated above, while no further details thereof are given.

As indicated in FIG. 11, according to example embodiments of the present invention, the apparatus 10 comprises a processing system or processor 11, a memory 12 and an interface 13, which are connected by a bus 14 or the like, and the apparatuses may be connected via link 30, respectively.

The processing system or processor 11 and/or the interface 13 may also include a modem or the like to facilitate communication over a (hardwire or wireless) link, respectively. The interface 13 may include a suitable transceiver coupled to one or more antennas or communication means for (hardwire or wireless) communications with the linked or connected device(s), respectively. The interface 13 is generally configured to communicate with at least one other apparatus, i.e. the interface thereof.

The memory 12 may store respective programs assumed to include program instructions or computer program code that, when executed by the respective processor, enables the respective electronic device or apparatus to operate in accordance with the example embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processing system or processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processing system or processor configured to [cause the apparatus to] perform xxx-ing" is construed to be equivalent to an expression such as "means for xxx-ing").

According to example embodiments of the present invention, an apparatus representing the apparatus 10 comprises a processing or at least one processor 11, at least one memory 12 including computer program code, and at least one interface 13 configured for communication with at least another apparatus. The apparatus 10, the processing system or processor (namely, the at least one processor 11, with the at least one memory 12 and the computer program code), is configured to perform receiving a first transmission, acquiring a number indicative of a size of a subsequent second transmission, estimating a signal to interference ratio based on said received first transmission, and determining transmission parameter information including at least one of a maximum transport block size indicating a maximum number of bits per packet, a modulation scheme and a code rate based on said signal to interference ratio and said number.

In its most basic form, stated in other words, the apparatus 10 may thus comprise respective means for receiving, means for acquiring a number, means for estimating a signal to interference ratio and means for determining transmission parameter information.

As outlined above, in enhanced forms, the apparatus 10 may comprise one or more of respective means for calculating a maximum transmission hit rate, means for calculating a maximum transport block size, means for choosing a transport block size, means for selecting a modulation scheme, means for deriving a code rate, means for selecting a modulation scheme, means for deriving a code rate, means for estimating an error rate, means for computing a signal to interference ratio offset, means for modifying the estimated signal to interference ratio, means for obtaining a threshold signal to interference ratio, means for precluding a highest transport block size from choosing, means for re-calculating a maximum transmission bit rate, means for re-calculating a maximum transport block size, means for receiving a signaling, means for deriving a number from said signaling, and means for transmitting transmission parameter information.

For further details of specifics regarding functionalities according to example embodiments of the present invention, reference is made to the foregoing description in conjunction with FIGS. 1 to 10.

Generally, the invention is implemented in an environment such as HSDPA system adopting TD-SCDMA. Example embodiments of the invention are represented by methods and/or correspondingly configured devices such as eNodeBs and/or UEs. More specifically, the invention generally relates to modem modules of such devices. Other systems can benefit also from the principles presented herein as long as they implement packet-based communication and CQI for adjusting transmission parameters based on propagation conditions.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under 3G, 3.9G and 4G implementations and can be implemented in user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined with one or more other of the above-described functions.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that whilst the above describes example embodiments of the invention, these descriptions should not be viewed in a limiting sense. Rather, there are several variations and modifications which may be made without departing from the scope of the present invention as defined in the appended claims.

According to the present invention there are provided measures for obtaining channel quality indicator (CQI) in a communication system. Such measures may exemplarily comprise receiving a first transmission, acquiring a number indicative of a size of a subsequent second transmission, estimating a signal to interference ratio based on said received first transmission, and determining transmission parameter information including at least one of a transport block size indicating a number of bits per packet, a modulation scheme and a code rate based on said signal to interference ratio and said number.

LIST OF ACRONYMS, ABBREVIATIONS AND DEFINITIONS

| | |
|---|---|
| 3GPP | 3rd Generation Partnership Project |
| AWGN | Additive White Gaussian Noise |
| BLER | Block Error Rate |
| CDMA2000 1x EVDO | Code Division Multiple Access 1x Evolution-Data Optimized |
| CQI | Channel Quality Indicator |
| CRC | Cyclic Redundancy Check |
| eNB | Evolved Node B, eNodeB |
| FRC | Fixed Reference Channel |
| HSDPA | High-Speed Downlink Packet Access |
| HS-DSCH | High Speed Downlink Shared Channel |
| HS-SCCH | High Speed Shared Control Channel |
| LTE | Long-Term Evolution |
| LTE-A | Long-Term Evolution-Advanced |
| QAM | Quadrature Amplitude Modulation (16 QAM, 32 QAM, 64 QAM) |
| QPSK | Quadrature Phase Shift Keying |
| RU | Resource Unit |
| SINR | Signal to Interference plus Noise Ratio |
| SIR | Signal to Interference Ratio |
| SNR | Signal to Noise Ratio |
| TB | Transport Block |
| TBS | Transport Block Size |
| TD-SCDMA | Time Division Synchronous Code Division Multiple Access |
| TFRI | Transport Format and Resource Indicator |
| TTI | Transmission Time Interval |
| UE | User Equipment |
| WCDMA FDD | Wideband Code Division Multiple Access in Frequency Division Duplex mode |

What is claimed is:

1. A method for use in obtaining channel quality indicator in a communication system, the method comprising:
   receiving a first transmission;
   acquiring a number indicative of a size of a subsequent second transmission, the size being associated with the number of resource units assigned for the second transmission;
   estimating a signal to interference ratio based on the received first transmission;
   determining transmission parameter information including at least, one of a transport block size indicating a number of bits per packet, a modulation scheme and a code rate based on the signal to interference ratio and the number; and
   transmitting the determined transmission parameter information to a device transmitting the first and second transmissions,
   wherein the determining comprises:
   calculating a maximum transmission bit rate based on the signal to interference ratio and the received number;
   calculating a maximum transport block size based on the maximum transmission bit rate and a predetermined packet duration.

2. The method according to claim 1, wherein the determining further comprises:
   choosing, from a plurality of predetermined transport block sizes, the transport block size which is next smaller than the calculated maximum transport block size;
   selecting the modulation scheme from a plurality of predetermined modulation schemes based on the chosen transport block size; and
   deriving the code rate based on the selected modulation scheme.

3. The method according to claim 2, wherein;
   the plurality of predetermined modulation schemes is sorted by a number of data bits per modulated symbol in ascending order,
   a plurality of predetermined code rate limits is assigned to the plurality of predetermined modulation schemes, respectively, and
   the determining further comprises executing in a loop:
      selecting the modulation scheme from the plurality of predetermined modulation schemes beginning with the lowest predetermined modulation scheme in ascending order; and
      deriving the code rate based on the chosen transport block sizes and the selected predetermined modulation scheme,
   until the derived code rate does not exceed the predetermined code rate limit assigned to the selected predetermined modulation scheme.

4. The method according to claim 3, further comprising:
   estimating an error rate based on the received first transmission;
   computing a signal to interference ratio offset based on the error rate, a predetermined error rate limit, a predetermined offset step value, a predetermined minimum threshold offset and a predetermined maximum threshold offset; and
   modifying the estimated signal to interference ratio by adding the computed signal to interference ratio offset to the estimated signal to interference ratio.

5. The method according to claim 3, further comprising:
   obtaining a threshold signal to interference ratio based on the highest transport block size of the plurality of predetermined transport block sizes and the acquired number; and
   precluding the highest transport block size from the choosing, if the estimated signal to interference ratio does not exceed the threshold signal to interference ratio by a predetermined exceedance value.

6. The method according to claim 5, further comprising:
   estimating an error rate based on the received first transmission;
   computing a signal to interference ratio offset based on the error rate, a first predetermined error rate limit, a predetermined offset step value, a predetermined minimum threshold offset and a predetermined maximum threshold offset, if the calculated maximum transport block size is less than a second highest transport block size of the plurality of predetermined transport block sizes;
   computing a signal to interference ratio offset based on the error rate, a second predetermined error rate limit smaller than the first predetermined error rate limit, a predetermined offset step value, a predetermined minimum threshold offset and a predetermined maximum threshold offset, if the calculated maximum transport block size is equal to or greater than the second highest transport block size of the plurality of predetermined transport block sizes;
   modifying the estimated signal to interference ratio by adding the computed signal to interference ratio offset to the estimated signal to interference ratio;
   re-calculating the maximum transmission bit rate based on the signal to interference, ratio and the received number; and
   re-calculating the maximum transport block size based on the maximum transmission hit rate and the predetermined packet duration.

7. The method according to claim 1, further comprising receiving a signaling including the number indicative of a size of a subsequent second transmission,
   wherein the acquiring comprises deriving the number from the signaling.

8. The method according to claim 1, further comprising transmitting the transmission parameter information as recommended transmission settings for the subsequent second transmission.

9. An apparatus for use in obtaining channel quality indicator in a cellular system, the apparatus comprising at least one processor, and at least one memory including computer program code, the at least one memory and the computer program code being configured to, with the at least one processor, cause the apparatus at least to:
   receive a first transmissions;
   acquire a number indicative of a size of a subsequent second transmission, the size being associated with the number of resource units assigned for the second transmission;
   estimate a signal to interference ratio based on the received first transmission;
   determine transmission parameter information including at least one of a transport block size indicating a number of bits per packet, a modulation scheme arid a code rate based on the signal to interference ratio and the number; and
   transmit the determined transmission parameter information to a device transmitting the first and second transmissions,
   wherein the at least one memory and the computer program code is configured to, with the at least one processor, further cause the apparatus to:

calculate a maximum transmission bit rate based on the signal to interference ratio and the received number;
calculate a maximum transport block size based on the maximum transmission bit rate and a predetermined packet duration.

10. The apparatus according to claim 9, the at least one memory and the computer program code being configured to, with the at least one processor, further cause the apparatus to:
choose, from a plurality of predetermined transport block sizes, the transport block size which is next smaller than the calculated maximum transport block size;
select the modulation scheme from a plurality of predetermined modulation schemes based on the chosen transport block size; and
derive the code rate based on the selected modulation scheme.

11. The apparatus according to claim 10, wherein:
the plurality of predetermined modulation schemes is sorted by a number of data bits per modulated symbol in ascending order,
a plurality of predetermined code rate limits is assigned to the plurality of predetermined modulation schemes, respectively, and
wherein the at least one memory and the computer program code are configured to, with the at least one processor, cause the apparatus to execute in a loop:
select the modulation scheme from the plurality of predetermined modulation schemes beginning with the lowest predetermined modulation scheme in ascending order; and
derive the code rate based on the chosen transport block sizes and the selected predetermined modulation scheme,
until the derived code rate does not exceed the predetermined code rate limit assigned to the selected predetermined modulation scheme.

12. The apparatus according to claim 11, the at least one memory and the computer program code being configured to, with the at least one processor, cause the apparatus to:
estimate an error rate based on the received first transmission;
compute a signal to interference ratio offset based on the error rate, a predetermined error rate limit, a predetermined offset step value, a predetermined minimum threshold offset and a predetermined maximum threshold offset; and
modify the estimated signal to interference ratio by adding the computed signal to interference ratio offset to the estimated signal to interference ratio.

13. The apparatus according to claim 12, the at least one memory and the computer program code being configured to, with the at least one processor, cause the apparatus to:
obtain a threshold signal to interference ratio based on the highest transport block size of the plurality of predetermined transport block sizes and the acquired number; and
preclude the highest transport block size from the choosing, if the estimated signal to interference ratio does not exceed the threshold signal to interference ratio by a predetermined exceedance value.

14. The apparatus according to claim 13, the at least one memory and the computer program code being configured to, with the at least one processor, cause the apparatus to:
estimate an error rate based on the received first transmission;
compute a signal to interference ratio offset based on the error rate, a first predetermined error rate limit, a predetermined offset step value, a predetermined minimum threshold offset and a predetermined maximum threshold offset, if the calculated maximum transport block size is less than a second highest transport block size of the plurality of predetermined transport block sizes;
compute a signal to interference ratio offset based on the error rate, a second predetermined error rate limit smaller than the first predetermined error rate limit, a predetermined offset step value, a predetermined minimum threshold offset and a predetermined maximum threshold offset, if the calculated maximum transport block size is equal to or greater than the second highest transport block size of the plurality of predetermined transport block sizes;
modify the estimated signal to interference ratio by adding the computed signal to interference ratio offset to the estimated signal to interference ratio;
re-calculate the maximum transmission bit rate based on the signal to interference ratio and the received number; and
re-calculate the maximum transport block size based on the maximum transmission bit rate and the predetermined packet duration.

15. The apparatus according to claim 9, the at least one memory and the computer program code being configured to, with the at least one processor, cause the apparatus to
receive a signaling including the number indicative of a size of a subsequent second transmission; and
derive the number from the signaling.

16. The apparatus according to claim 9, the at least one memory and the computer program code being configured to, with the at least one processor, cause the apparatus to transmit the transmission parameter information as recommended transmission settings for the subsequent second transmission.

17. The apparatus according to claim 9, wherein the apparatus is operable as or at a base station or access node of a cellular system or as or at a terminal, user equipment, mobile station or modem in a cellular system, and/or
the apparatus is operable in at least one of a 3G, LTE and a LTE-A cellular system.

18. A computer program product comprising a non-transitory computer-readable storage medium baying computer readable instructions stored thereon, the computer readable instructions being executable by a computerized device to cause the computerized device to:
receive a first transmission; acquire a number indicative of a size of a subsequent second transmission, the size being associated with the number of resource units assigned for the second transmission;
estimate a signal to interference ratio based on the received first transmission;
determine transmission parameter information including at least one of a transport block size indicating a number of bits per packet, a modulation scheme and a code rate based on the signal to interference ratio and the number; and
transmit the determined transmission parameter information to a device transmitting the first and second transmissions,
wherein the computerized device is further caused to:
calculating a maximum transmission bit rate based on the signal to interference ratio and the received number;
calculating a maximum transport block size based on the maximum transmission bit rate and a predetermined packet duration.

* * * * *